No. 725,921. PATENTED APR. 21, 1903.
E. BASEMAN.
SEEDING MACHINE.
APPLICATION FILED OCT. 18, 1902.
NO MODEL.
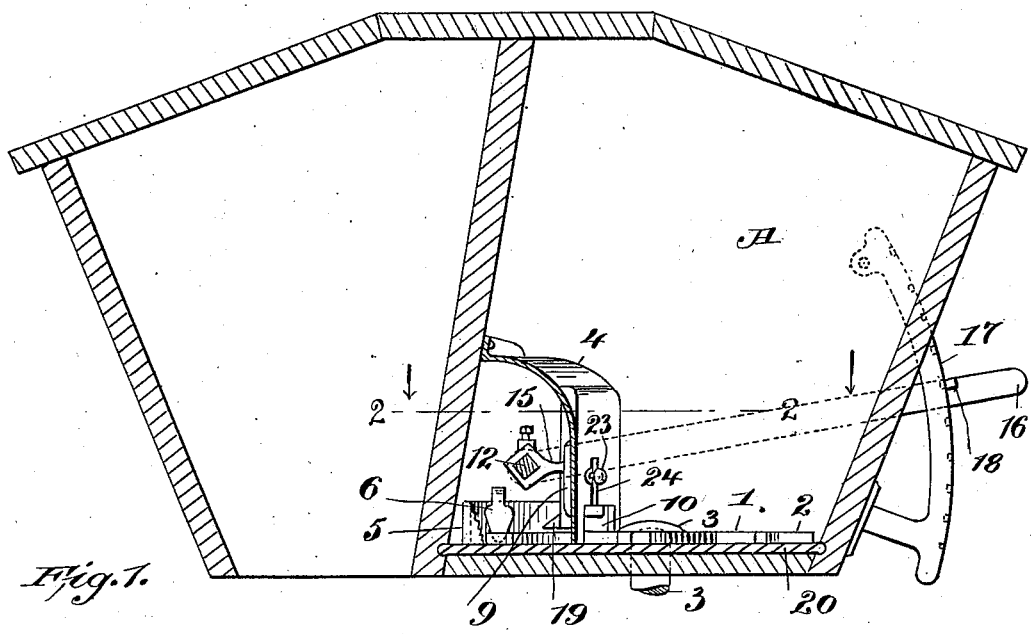
Fig. 1.
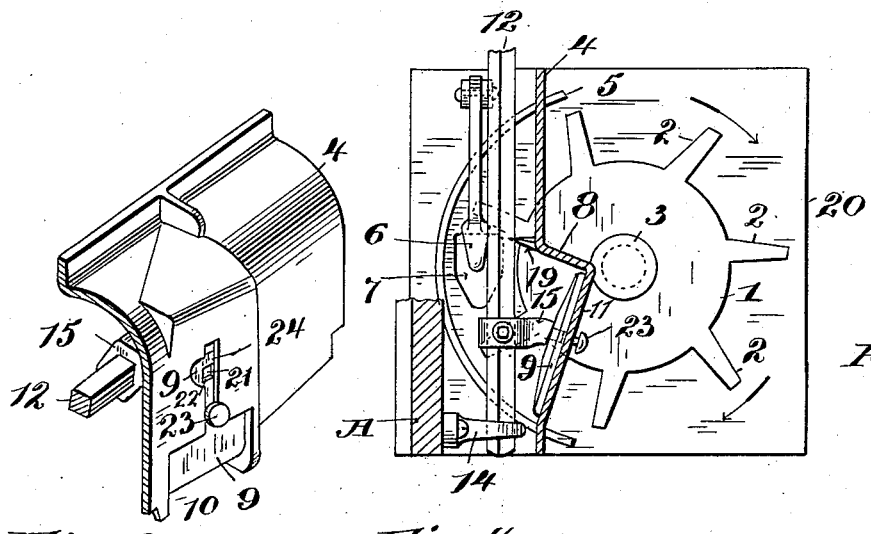
Fig. 2.
Fig. 3.
Fig. 4.
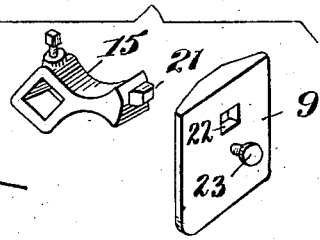
WITNESSES:
C. W. Benjamin
M. W. Clephane
INVENTOR
Ernest Baseman,
BY
ATTORNEY

UNITED STATES PATENT OFFICE.

ERNEST BASEMAN, OF MACEDON, NEW YORK, ASSIGNOR TO BICKFORD AND HUFFMAN COMPANY, OF MACEDON, NEW YORK, A CORPORATION OF NEW YORK.

SEEDING-MACHINE.

SPECIFICATION forming part of Letters Patent No. 725,921, dated April 21, 1903.

Application filed October 18, 1902. Serial No. 127,779. (No model.)

*To all whom it may concern:*

Be it known that I, ERNEST BASEMAN, a citizen of the United States, residing at Macedon, in the county of Wayne and State of New York, have invented certain new and useful Improvements in Seeding-Machines, of which the following is a specification.

My invention relates to seeding-machines or grain-drills, and more particularly to that class thereof wherein means are employed for varying the amount of seed, grain, or fertilizer distributed. My improved devices are shown herein as applied to the fertilizer-feed of the seeding-machine or grain-drill; but it will be obvious that parts thereof may be applied to the grain-feed or to other mechanisms wherein similar results are desired.

The invention consists in the construction and combination of parts now to be described in the specification and as finally pointed out in the claims.

Referring to the drawings, wherein the same parts are designated by the same characters of reference throughout the several views, Figure 1 is a sectional view of the hopper of a grain-drill, showing the mode of application thereto of my invention. Fig. 2 is a sectional view of one of the distributing-wheels and connected parts, taken substantially on the line 2 2 in Fig. 1. Fig. 3 is a detached sectional view of a portion of the back plate and connected parts, and Fig. 4 is a detail view illustrating the detachability of the gate and its adjusting-arm.

The box or hopper A may be of the ordinary or any suitable construction and may be provided with a series of fertilizer-distributers, only one of which is shown in the drawings. These fertilizer-distributers are of the general class shown and described in the United States patent to S. H. Everett, No. 479,637, July 26, 1892, on which my present invention is an improvement.

The fertilizer-wheel 1 is provided with a series of projecting points or teeth 2 and a spindle or boss 3, which is suitably actuated in such manner that the wheel 1 is rotated in the direction of the arrow in Fig. 2, and the fertilizer in contact therewith is conveyed and carried through the opening 10 in the back plate 4 between the said back plate and the curved fin 5 and is permitted to pass through the orifice 7 in the bottom plate 20 to the further distributing devices. A pivoted hammer 6, formed with an inclined under face, is operated by the teeth or points 2 of the wheel 1 in such manner that the discharge of the fertilizer through the orifice 7 is accelerated and rendered more certain. These devices, however, form no part of my present invention. In the Everett patent already referred to it will be noticed that the opening through which the fertilizer is conveyed by the teeth or points of the fertilizer-wheel extends for some little distance over the web of the wheel, but that between the central point of the web and the back plate there is still a considerable portion of the web which does not pass behind the back plate and which rotates with the wheel exterior thereto and that the fertilizer on this exterior space will therefore pass with the wheel and will not be carried through the opening in the back plate. In order to prevent this waste of feeding-space on the fertilizer-wheel, I have formed the back plate 4 with an offset portion 8, which extends outwardly at an angle from the back plate 4 almost to the boss or spindle 3 of the wheel 1, (see Fig. 2,) from which point the back plate 4 again returns at an angle to approximately the point 11, and it is in this last-mentioned portion of the back plate 4 that the opening 10 is formed in such manner that as the wheel 1 is rotated the fertilizer engaged by the teeth 2, as well as that upon the web 1, will be forced and carried therethrough and delivered at the proper point for its discharge through the orifice 7. The fertilizer on the web of the wheel 1 will be scraped therefrom at the rear of the back plate 4 by the angularly-inclined offset portion 8 and the projecting lug 19, formed upon the back plate, in such manner that none of it will be carried beyond these points on the web of the wheel in its further rotation. Another advantage arising from the formation of the offset portion 8 upon the back plate 4 is that its projection into the mass of fertilizer tends to check the general tendency of the mass to be moved by the wheels toward one end of the hopper.

In order to vary the size of the opening 10 in the back plate 4, I employ a vertically-adjustable gate 9, so as to change the amount of fertilizer fed therethrough in substantially the same manner as in the Everett patent referred to. The gate 9, however, is provided with a projecting piece or stud 23, adapted to engage a vertical slot 24, formed in the back plate 4, whereby the gate 9 is held in proper position and vertically guided. As in the Everett patent, the gate 9 may be moved vertically by the arm 15 upon the rock-shaft 12. The arm 15 is provided at its outer end with a projecting portion 21, which engages with a corresponding recess 22 in the gate 9, thus permitting the ready detachability of the gate from the arm. In the Everett device the gate is shown as firmly secured to the arm, which served also to guide the gate; but the necessity for this disappears in view of the guiding device for the gate 9 already described. The rock-shaft 12 extends the entire length of the hopper and is supported in any suitable manner—as, for instance, by brackets 14 14, one of which is shown in Fig. 2. One end of the rock-shaft 12 passes through the end of the hopper, where it is rigidly attached to the adjusting-lever 16, which, preferably, is formed as a spring-arm and lies adjacent to the quadrant 17, having adjusting-notches with any one of which the projection 18 of the arm 16 may be caused to engage, thus affording a convenient and positive means of varying the position of the rock-shaft 12, and thereby of adjusting the position of the gates 9 and of altering the size of the openings 10 and the amount of fertilizer to be fed therethrough.

It will be obvious that many changes and alterations may be made in the mechanism as set forth and that other applications thereof may be made without departing from the spirit of my invention.

Having thus described my invention, its construction, and mode of operation, what I claim, and desire to secure by Letters Patent of the United States, is as follows:

1. In a seeding-machine, the combination with the hopper and a feeding-wheel therein, of a back plate located within the hopper and having an offset portion approaching approximately to the central portion of the wheel, the said back plate being formed with an entrance therein.

2. In a seeding-machine, the combination with the hopper and a feeding-wheel therein, of a back plate located within the hopper and having an offset portion approaching approximately to the central portion of the wheel, the said back plate being formed with an entrance therein and placed above the feeding-wheel so as to coöperate therewith.

3. In a seeding-machine, the combination with the hopper and a feeding-wheel therein, of a back plate located within the hopper, the said back plate having an offset portion and being formed with an entrance therein, together with a lug formed upon the rear of the back plate.

4. In a seeding-machine, the combination with the hopper and a feeding-wheel therein, of a back plate located within the hopper, the said back plate having an offset portion and being formed with an entrance therein, together with an adjustable gate for the entrance.

5. In a seeding-machine, the combination with the hopper and a back plate located within the hopper and formed with an entrance therein, of an adjustable gate for the entrance formed with a piece to engage a guide-slot in the back plate, and suitable means for adjusting the gate.

6. In a seeding-machine, the combination with the hopper and a back plate located within the hopper, the said back plate having an offset portion and an entrance formed therein, of an adjustable gate for the entrance formed with a piece to engage a guide-slot in the back plate, and suitable means for adjusting the gate.

7. In a seeding-machine, the combination with the hopper and a back plate located within the hopper and formed with an entrance therein, of an adjustable gate for the entrance, and means detachably connected to the said gate for adjusting it.

8. In a seeding-machine, the combination with the hopper and a back plate located within the hopper and formed with an entrance therein, of an adjustable gate for the entrance, suitable means detachably connected to the said gate for adjusting it, and further means to hold and guide the said gate upon the back plate.

9. In a seeding-machine, the combination with the hopper and a back plate located within the hopper and formed with an entrance therein, of an adjustable gate for the entrance, means for holding and guiding the gate upon the back plate, a rock-shaft, an arm thereon, and means detachably connecting the arm and gate.

10. In a seeding-machine, the combination with the hopper and a back plate located within the hopper and formed with an entrance therein, of an adjustable gate for the entrance having a piece to engage a guide-slot in the back plate, a rock-shaft, an arm thereon, and means for detachably connecting the arm to the gate.

In testimony whereof I have signed my name to this specification in the presence of two subscribing witnesses.

ERNEST BASEMAN.

Witnesses:
D. C. TICKNOR,
BURROUS McNIER.